(12) United States Patent
Hinkfoth

(10) Patent No.: US 10,189,520 B2
(45) Date of Patent: Jan. 29, 2019

(54) MODULAR SYSTEM FOR A VEHICLE

(71) Applicant: Volkswagen Aktiengesellschaft, Wolfsburg (DE)

(72) Inventor: Joerg Hinkfoth, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 13 days.

(21) Appl. No.: 15/462,236

(22) Filed: Mar. 17, 2017

(65) Prior Publication Data

US 2017/0190368 A1 Jul. 6, 2017

Related U.S. Application Data

(63) Continuation of application No. PCT/EP2015/070901, filed on Sep. 11, 2015.

(30) Foreign Application Priority Data

Sep. 17, 2014 (DE) .................. 10 2014 218 698

(51) Int. Cl.
*B60N 2/75* (2018.01)
*B62D 25/14* (2006.01)
(Continued)

(52) U.S. Cl.
CPC ............ *B62D 65/14* (2013.01); *B60J 5/04* (2013.01); *B60N 2/78* (2018.02); *B60R 13/0243* (2013.01);
(Continued)

(58) Field of Classification Search
CPC ........ B62D 65/14; B62D 25/14; B62D 65/06; B60R 13/0243; B60R 2013/0293; B60N 2/78; B60N 2/466; B60J 5/04
See application file for complete search history.

(56) References Cited

U.S. PATENT DOCUMENTS

| 2001/0030435 A1 | 10/2001 | Burns et al. |
| 2010/0123332 A1 | 5/2010 | Hotary et al. |
| 2014/0054914 A1* | 2/2014 | Teoh .................. B29C 45/0053 296/1.08 |

FOREIGN PATENT DOCUMENTS

| DE | 41 41 145 A1 | 6/1993 |
| DE | 197 48 780 A1 | 5/1998 |

(Continued)

OTHER PUBLICATIONS

Auto Parts Blog, at http://autopartsinfo.blogspot.de/2012/04/auto-interior-car-leather.html, pp. 1-7 (Apr. 2012).

*Primary Examiner* — D Glenn Dayoan
*Assistant Examiner* — Melissa A Black
(74) *Attorney, Agent, or Firm* — Muncy, Geissler, Olds & Lowe, P.C.

(57) ABSTRACT

A modular system for a vehicle, in particular a motor vehicle, whereby the vehicle is to be provided with a selected instrument panel and at least one selected door, which can be arranged on the vehicle in a pivotal manner in order to close or release a vehicle door opening adjoining the instrument panel, whereby the modular system has at least two different instrument panels and/or at least two different doors for selection, whereby each instrument panel has a first joint region, and each door has a second joint region which corresponds to the first joint region such that each first joint region and the respective second joint region always form the same joint in the closed position of the door.

7 Claims, 3 Drawing Sheets

(51) Int. Cl.
*B60R 13/02* (2006.01)
*B62D 65/06* (2006.01)
*B62D 65/14* (2006.01)
*B60J 5/04* (2006.01)

(52) U.S. Cl.
CPC .......... *B60R 13/0256* (2013.01); *B62D 25/14* (2013.01); *B62D 65/06* (2013.01); *B60R 2013/0293* (2013.01)

(56) References Cited

FOREIGN PATENT DOCUMENTS

| | | |
|---|---|---|
| DE | 198 13 037 A1 | 9/1999 |
| DE | 199 36 597 A1 | 2/2001 |
| DE | 100 10 749 A1 | 9/2001 |
| DE | 102 00 888 A1 | 7/2003 |
| DE | 10 2004 004 997 A1 | 9/2005 |
| DE | 10 2009 012 645 A1 | 9/2010 |
| DE | 10 2010 009 570 A1 | 9/2011 |
| JP | H 11-78613 A | 3/1999 |
| WO | WO 2012/110413 A1 | 7/2014 |

* cited by examiner

MODULAR SYSTEM FOR A VEHICLE

This nonprovisional application is a continuation of International Application No. PCT/EP2015/070901, which was filed on Sep. 11, 2015, and which claims priority to German Patent Application No. 10 2014 218 698.6, which was filed in Germany on Sep. 17, 2014, and which are both herein incorporated by reference.

BACKGROUND OF THE INVENTION

1. Field of the Invention

The invention relates to a modular system for a vehicle, in particular a motor vehicle, whereby the vehicle is to be provided with a selected instrument panel and at least one selected door, which can be arranged on the vehicle in a pivotal manner in order to close or release a vehicle door opening adjoining the instrument panel.

2. Description of the Background Art

So that a vehicle door adjoining an instrument panel can be closed securely, a joint remains between the door and the instrument panel in the closed door position. It is known from the Unexamined German Patent Application DE 198 13 037 A1 that to enhance the visual impression, the door overlaps an end section of the instrument panel without a gap, so that the joint is substantially covered. An assembly set for manufacturing a door module, which is to be integrated into a vehicle door and is intended to facilitate a modular motor vehicle door design adapted to different requirements, is known furthermore from the Unexamined German Patent Application DE 10 2009 012 645 A1. If the interior design is to be redesigned or modified, up to now the door and instrument panel must again be matched to one another, so that the necessary joint is retained.

SUMMARY OF THE INVENTION

It is therefore an object of the invention to provide a modular system that enables a high number of variations in the design of in particular the vehicle interior in a simple and cost-effective manner.

In an exemplary embodiment, an advantage is that the instrument panel and door always form a joint that satisfies the requirements of a predeterminable gap size, irrespective of which door or which instrument panel of the modular system is installed. As a result, an interchangeability of the instrument panel and/or doors within the modular system is assured, which offers different design options without changes having to be made structurally. The modular system of the invention provides at least two different instrument panels and/or at least two different doors for selection, whereby each particular instrument panel has a first joint region and each particular door has a second joint region corresponding to the first joint region, such that the particular first joint region and the particular second joint region always form the same joint in the closed door position. The doors and/or instrument panels are therefore formed such that regardless of which combination of door and instrument panel within the modular system is selected, the same joint is always formed between the door and instrument panel and thus the free combinability of door and instrument panel is assured. "Same joint" in the context of the present application can be understood to mean that the joints formed according to the invention have substantially the same or the same joint width, in other words, a joint gap of the same width. Preferably, the joints formed according to the invention each also have the same orientation, in other words, the same or substantially the same angular plane in the spatial coordinate system of the vehicle.

Expediently, the second joint region of the different doors and the first joint region of the different instrument panels can be formed identically for this purpose. Apart from the first or second joint region, the instrument panels and/or doors are expediently formed differently, for example, to fulfill different functions. Even with a small number of a plurality of different doors and/or instrument panels, many different variation options can be realized cost-effectively as a result. Preferably, each modular system has a plurality of doors of a first type and a plurality of doors of at least one second type, each of which have the same second joint region. Accordingly, the modular system alternatively or in addition preferably has a plurality of instrument panels of a first type and a plurality of instrument panels of at least one second type, each of which have the same first joint region. Particularly preferably, the modular system has more than only two types of instrument panels and/or doors so as to increase further the variety or variability of the modular system.

It is provided according to an embodiment of the invention that the different doors in their second joint region have a depression for partially receiving the particular instrument panel with its first joint region. Because the instrument panel at its first joint region is partially received by the door, an overlap arises between the door and instrument panel which covers at least in sections the joint between the door and instrument panel, as a result of which the visual impression is improved. Because the doors of the modular system, on the one hand, and the instrument panels of the modular system, on the other, each have the same first or the same second joint region, the variable combinability within the modular system is assured in this design as well.

It is provided according to an embodiment of the invention that the different doors in particular on their inner side have armrests of different width. It is possible as result, for example, to provide wider armrests in a vehicle that has two seats in the first row of seats and narrower armrests in a vehicle that has three seats in the first row of seats, in order to always utilize the interior space optimally. The advantageous modular system therefore allows adaptation of the interior trim in a simple manner to the interior design, in particular the number of seats in a first row of seats of the vehicle, located opposite to the instrument panel.

It is provided according to an embodiment of the invention that the different instrument panels are made with a different width. As a result, the instrument panels can be used, for example, in different vehicle types. In addition, if a number of different doors of the type of the invention are provided, thus these can be combined differently with the selected instrument panel. Thus, the doors can be provided both in a vehicle with a broad instrument panel and in a vehicle with a narrower instrument panel. The width of the instrument panel in this case can be understood to mean the extent of the instrument panel from the driver side to the passenger side of the vehicle or motor vehicle, therefore, in particular the extent of the instrument panel from one door to an opposite further door. Expediently, the modular system has a plurality of different doors for the driver side and a plurality of different doors for the passenger side, whereby the doors for the driver side can be made as a mirror image to the doors for the passenger side.

The doors can each have a door frame and an insert part arranged on the door frames, whereby the insert part forms the first joint region. The doors therefore can be formed as multiple parts in each case, whereby the part forming the first joint region is formed by an insert part arranged on a door frame. It is possible as a result that the door frames of the different doors are always made the same, and the design of the door results only by the provision of different insert parts. There can be a further saving of manufacturing costs as a result. In particular, different insert parts can be provided, which have, for example, armrests of different width, a different arrangement of control elements, and/or different arrangements of or mounting provisions for loudspeakers. In particular, the different instrument panels and/or the different doors are also characterized in that they are provided with a different decoration. The different doors can have different door frames, which are formed in particular with a different width. Thus, preferably overall at least two different door frames, at least two different insert parts, and at least two different instrument panels are available in the modular system for use in a motor vehicle, and these can be combined with one another.

The door frames and the insert parts can be formed such that each insert part can be arranged in/on each door frame. As a result, the insert parts can also be freely combined with the door frames, as a result of which the variability of the modular system can be increased still further. In particular, the door frames can have insert part receptacles with identical inner contours, whereas the insert parts are provided with identical outer contours, corresponding to the inner contours, so that the insert parts can always be inserted in the insert part receptacles of the particular door frame.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
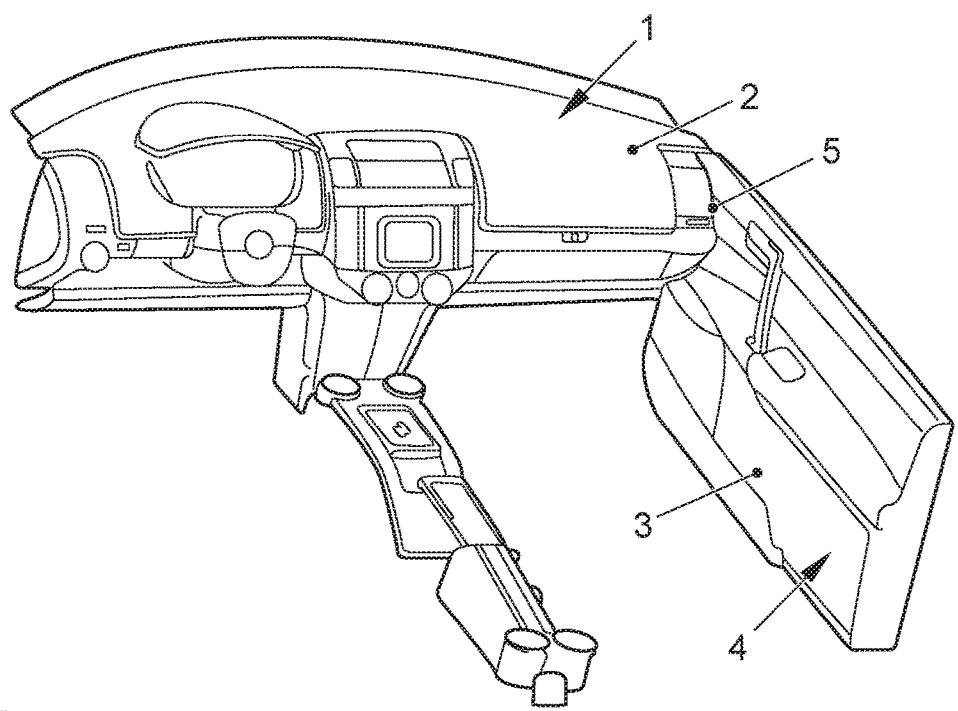
FIG. 1 shows a vehicle in a simplified interior view.

FIG. 1 shows interior 1 of a motor vehicle in a perspective illustration. Interior 1 in the region of the front row of seats of the motor vehicle is characterized by an instrument panel 2 and interior trim 3 of a door 4. Shown is the view of instrument panel 2 and door 4, which in this respect represents a passenger door of the motor vehicle. The driver door is not shown for the sake of clarity.

Instrument panel 2 is formed of multiple parts and extends from the driver side to the passenger side over the entire width of interior 1 of the motor vehicle. As is customary, instrument panel 2 contains display instruments and control elements of the motor vehicle and optionally, a passenger airbag and air vents. Interior trim 3 of door 4 abuts laterally against the passenger-side end of instrument panel 2, as a result of which a joint 5, also called the king's joint, is formed between door 4 and instrument panel 2.

Figure 2A:
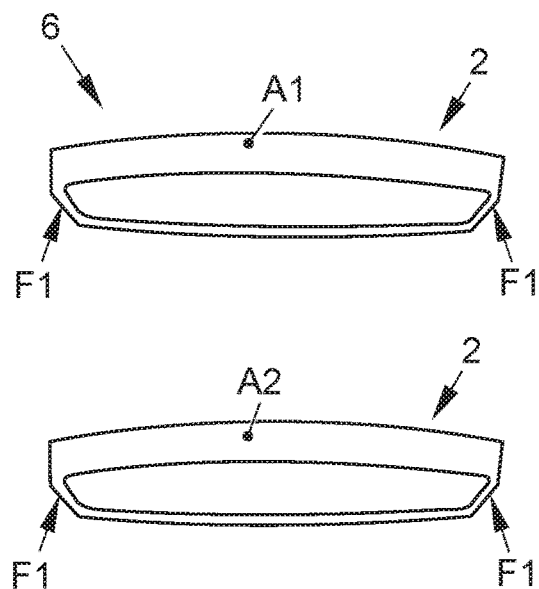
FIGS. 2A to 2C show a modular system for the vehicle in a simplified illustration.

FIG. 2 shows a modular system for interior 1 of the motor vehicle. Modular system 6 according to FIG. 2A has two instrument panels A1, A2, which are formed differently. It is provided in particular that instrument panels A1, A2 have a different design, whereby instrument panel A1 is formed, for example, for the passenger vehicle sector, whereas instrument panel A2 was designed for the commercial vehicle sector. To this end, instrument panels A1, A2 can differ, for example, in that instrument panel A2 has more storage options available, whereas instrument panel A1 is designed with a higher quality and with a more sophisticated design.

Instrument panels A1, A2 on their passenger-door-side or driver-door-side ends each have a first joint region F1, which in the installed state, as shown in FIG. 1, concurrently forms joint 5 between instrument panel A2 and passenger door 4 or the driver door (not shown).

Figure 2B:
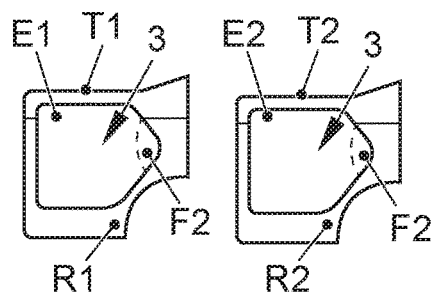
Figure 2C:
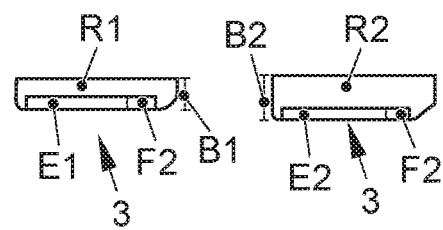

Modular system 6, furthermore, has two different doors T1 and T2, which are shown in FIG. 2B in a side view and in FIG. 2C in a top plan view. Doors T1 and T2 have the same dimensions in the side view. It can be seen in the top plan view according to FIG. 2C that door T2 has a width B2, which is made greater than width B1 of door T1. Doors T1 and T2 each have a door frame R1 and R2, which is mountable pivotably on motor vehicle 2, or on an auto body of motor vehicle 2. Further, the particular door T1, T2 has an insert part E1 or E2, respectively, which forms at least substantially interior trim 3. Insert parts E1 and E2 each have a second joint region F2. Joint regions F2 of doors T1, T2 or insert parts E1, E2 are formed identical to one another. In other respects, doors T1, T2 are formed differently. Thus, it can be provided in particular that armrest 8 in door T1 is made narrower than armrest 8 in door T2. As a result, door T1, for example, is more suitable for motor vehicles that have three seats in the first row of seats and in this regard require more room in terms of width. Door T2 is then of advantage, if the first row of seats has only two seats, so that more room is available overall and in particular the seating comfort for the occupants is to be optimized by a wider armrest.

Joint regions F1 and F2 are formed corresponding to one another. Because joint region F2 of respective door T1, T2 is formed identical, doors T1 and T2 can be combined as desired with instrument panels A1, A2 whose joint regions F1 are formed identical to one another. For this reason, different variations for the interior design of the motor vehicle can be realized without great cost by modular system 6.

Insert parts E1 and E2 differ further preferably in that they have a different visual and optionally high-value design, whereby, for example, insert part E1 is formed for the passenger vehicle sector and the other insert part E2 probably for the commercial vehicle sector, like instrument panels A1 and A2. In this case, it can be provided, for example, that insert part E1 supports an operating switch for an electrical window operator, whereas insert part E2 supports a crank handle for the manual operation of the window.

Figure 3A:
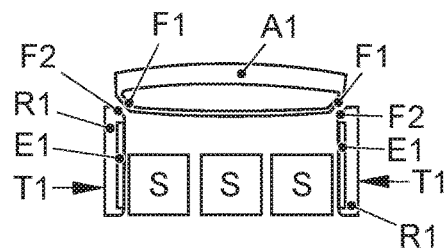
FIGS. 3A to 3H show different combination options for the modular system, each in a simplified illustration.

FIGS. 3A to H show different combinations of instrument panel 2 and door 4 from modular system 6. FIG. 3A shows a first combination in which instrument panel A1 is combined with door T1. It is provided here that door T1 is also provided on the driver side of the motor vehicle. Expediently, door T1 on the driver side of the motor vehicle is made as a mirror image to door T1 on the passenger side. Expediently, modular system 6 has appropriate versions of doors T1 and T2 or door frames R1 and R2 and insert parts E1 and E2 both for the driver door and for the passenger door. In the first exemplary embodiment of FIG. 3A, the vehicle has three seats S in the first row of seats between doors T1 on the driver side and passenger side. Doors T1 with insert parts E1 are made narrow and have narrow armrests, so that the maximum possible room for three vehicle occupants is provided.

Figure 3D:
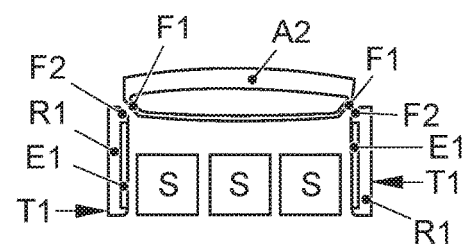
Figure 3B:
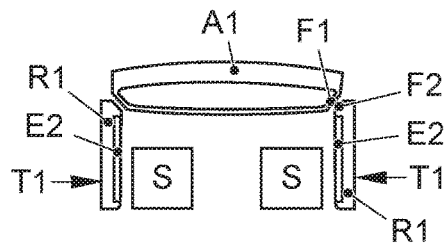

FIG. 3B shows a second exemplary embodiment in which only two seats are provided in the first row of seats. To increase driving comfort, in this case doors T1 are formed by door frames R1 and insert parts E2, so that, on the one hand, there is a narrow door frame and, on the other, a wide armrest is provided by insert part E2. To this end, door frames R1 and R2 expediently have the same insert part receptacles, so that insert parts E1, E2 can be combined as desired with door frames R1 and R2.

Figure 3E:
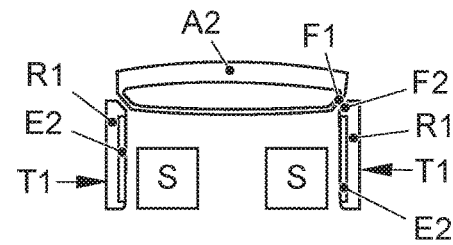
Figure 3C:
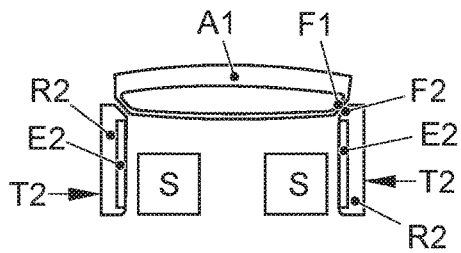

FIG. 3C shows a further exemplary embodiment in which instrument panel A1 is combined with doors T2, whereby doors T2 according to FIGS. 2B and C are formed by door frame R2 and insert part E2.

FIG. 3D in a further exemplary embodiment shows a variant in which instrument panel A2 was combined with narrow door frames R1 or doors T1, whereby doors T1 has insert parts E2, and whereby three seats S are provided next to one another in the first row of seats.

FIG. 3E shows a further exemplary embodiment which corresponds substantially to the previous exemplary embodiment, whereby only two seats S are provided in the first row of seats, and in each case insert parts E2 are arranged in door frames R1.

Figure 3F:
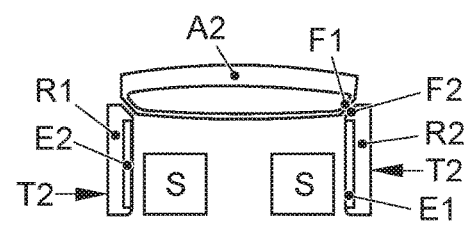

FIG. 3F shows an exemplary embodiment in which instrument panel A2 was combined with door T2, whereby insert parts E2 were replaced by insert parts E1.

Figure 3G:
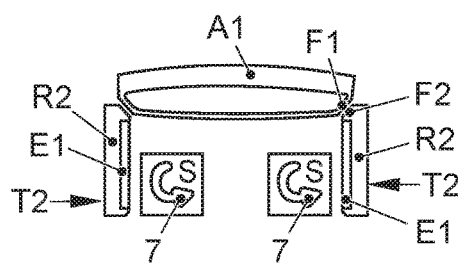

FIG. 3G shows a further exemplary embodiment in which instrument panel A1 was combined with doors T2, and whereby insert parts E1 are provided on doors T2, as in the exemplary embodiment of FIG. 3F. In this case, the two seats S in the first row of seats are disposed rotatably in the motor vehicle, as indicated by an arrow 7.

Figure 3H:
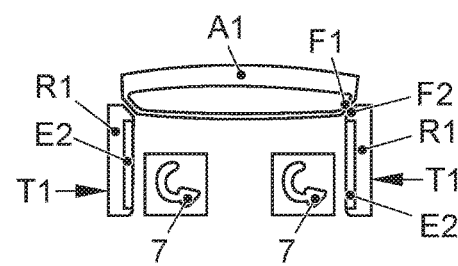

FIG. 3H shows a further exemplary embodiment, which in contrast to the exemplary embodiment of FIG. 3G combines doors T1 with instrument panel 1, whereby insert parts E2 are provided instead of insert parts E1.

It becomes clear based on the exemplary embodiments that a diverse combination of instrument panels A1, A2 and doors T1, T2 or door frames R1, R2 and insert parts E1, E2 is possible. Because first joint regions F1 and second joint regions F2 are each made identical, so that first joint region F1 of the selected instrument panel always corresponds to second joint region F2 of selected door T1, T2 in order to always form joint 5 the same, it is possible accordingly to combine freely with one another the components for the interior design of the vehicle from modular system 6, so that, for example, for two-seat vehicles wide door interior trims with decorative strips can be provided, whereas for three-seat vehicles narrow doors without decorative strips can be provided. Joint 5 in this case has the same joint gap width and the same angular plane orientation in the spatial coordinate system of the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A modular system for a vehicle comprising:
a selected instrument panel that extends over a width of an interior of the motor vehicle from a driver side of the vehicle to a passenger side of the vehicle;
at least one selected door that is arranged on a side of the vehicle in a pivotal manner in order to close or open a vehicle door opening adjoining the selected instrument panel;
wherein the modular system has at least two different instrument panels and/or at least two different doors for selection, wherein each instrument panel has a first joint region and each door has a second joint region,
wherein the second joint region is pivoted away from the first joint region when the at least one selected door is pivoted into an open position and the second joint region is pivoted towards the first joint region so as to adjoin the first joint region and form a unitary joint when the at least one selected door is pivoted into a closed position, and
wherein the second joint region corresponds to the first joint region such that each first joint region and each second joint region, when adjoined in the closed position of the door, always form the unitary joint with a same joint gap width therebetween.

2. The modular system according to claim 1, wherein the doors in their second joint region have a depression for partially receiving the particular instrument panel with its first joint region.

3. The modular system according to claim 1, wherein the doors are formed with armrests of different widths.

4. The modular system according to claim 1, wherein the instrument panels are made with a different width.

5. The modular system according to claim 1, wherein each door has a door frame and an insert part arranged on the door frames, and wherein the insert part forms the second joint region.

6. The modular system according to claim 1, wherein different insert parts are provided to form the different doors.

7. The modular system according to claim 5, wherein the door frame and the insert part are formed such that each insert part is configured to be arranged in or on each door frame.

* * * * *